United States Patent
Arnold et al.

(10) Patent No.: US 9,002,603 B2
(45) Date of Patent: Apr. 7, 2015

(54) METHOD FOR THE OPERATION OF A TRANSMISSION DEVICE IN A VEHICLE DRIVE TRAIN WHEN A REQUEST IS MADE TO CHANGE GEARS

(75) Inventors: Jorg Arnold, Immenstaad (DE); Valentine Herbeth, Friedrichshafen (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 36 days.

(21) Appl. No.: 13/991,693

(22) PCT Filed: Nov. 8, 2011

(86) PCT No.: PCT/EP2011/069581
§ 371 (c)(1),
(2), (4) Date: Jun. 5, 2013

(87) PCT Pub. No.: WO2012/079847
PCT Pub. Date: Jun. 21, 2012

(65) Prior Publication Data
US 2013/0268168 A1   Oct. 10, 2013

(30) Foreign Application Priority Data
Dec. 14, 2010   (DE) .................. 10 2010 063 027

(51) Int. Cl.
*F16H 61/12*   (2010.01)
*F16H 61/686*   (2006.01)
(Continued)

(52) U.S. Cl.
CPC ............... *F16H 61/12* (2013.01); *F16H 3/663* (2013.01); *F16H 61/686* (2013.01);
(Continued)

(58) Field of Classification Search
CPC .................. F16H 61/12; F16H 61/686; F16H 2200/2064; F16H 2200/2094

USPC ............................ 701/51, 62, 67; 477/34, 99
See application file for complete search history.

(56) References Cited

U.S. PATENT DOCUMENTS 6,357,289 B1   3/2002   Futawatari
7,789,792 B2   9/2010   Kamm et al.
(Continued)

FOREIGN PATENT DOCUMENTS

DE   100 39 922 A1   4/2001
DE   101 20 899 A1   10/2002
(Continued)

OTHER PUBLICATIONS

German Search Report Corresponding to 10 2010 063 027.6 mailed Oct. 10, 2011.
(Continued)

*Primary Examiner* — Thomas Tarcza
*Assistant Examiner* — Kevin Myhre
(74) *Attorney, Agent, or Firm* — Davis & Bujold, PLLC; Michael J. Bujold

(57) ABSTRACT

A method of operating a transmission of a vehicle drive-train when a gearshift from a current gear toward a target gear has been requested. The transmission having frictional shifting elements and at least one interlocking shifting element. If an actuating electrical current, equivalent to a closed operating condition of the frictional shifting element to be engaged, and an actuating electrical current, equivalent to an open operating condition of the interlocking shifting element to be disengaged, are determined while, at the same time, a closed operating condition of the interlocking shifting element to be disengaged is detected by a sensor, a fault is recognized. If the fault is recognized during a predefined test period, one or more selected shifting elements are disengaged and a force flow in the transmission is interrupted. Alternatively, by disengaging the frictional shifting element to be engaged, the current gear is engaged in the transmission.

11 Claims, 2 Drawing Sheets

(51) Int. Cl.
*F16H 3/66* (2006.01)
*F16H 59/68* (2006.01)

(52) U.S. Cl.
CPC .................. *F16H 2059/6807* (2013.01); *F16H 2061/1224* (2013.01); *F16H 2061/1272* (2013.01); *F16H 2200/2094* (2013.01); *F16H 2200/2064* (2013.01)

(56) References Cited

U.S. PATENT DOCUMENTS

| | | | |
|---|---|---|---|
| 8,257,215 | B2 | 9/2012 | Borntraeger |
| 8,394,000 | B2 | 3/2013 | Popp et al. |
| 8,398,522 | B2 | 3/2013 | Bauknecht et al. |
| 2004/0152563 | A1 | 8/2004 | Dreibholz et al. |
| 2007/0232432 | A1* | 10/2007 | Yoneyama ................ 475/119 |
| 2009/0287386 | A1* | 11/2009 | Tomoda ..................... 701/67 |
| 2011/0263380 | A1 | 10/2011 | Cuppers et al. |
| 2011/0284335 | A1 | 11/2011 | Arnold et al. |
| 2011/0301819 | A1 | 12/2011 | Arnold et al. |
| 2012/0022752 | A1 | 1/2012 | Arnold et al. |
| 2012/0029778 | A1 | 2/2012 | Arnold et al. |
| 2012/0037472 | A1 | 2/2012 | Rosemeier et al. |
| 2012/0135838 | A1 | 5/2012 | Cuppers et al. |

FOREIGN PATENT DOCUMENTS

| | | |
|---|---|---|
| DE | 10 2005 002 337 A1 | 8/2006 |
| DE | 10 2007 005 438 A1 | 8/2008 |
| DE | 10 2008 000 254 A1 | 8/2008 |
| DE | 10 2008 000 209 A1 | 8/2009 |
| DE | 10 2008 000 429 A1 | 9/2009 |
| DE | 10 2008 001 566 A1 | 11/2009 |
| DE | 10 2008 001 567 A1 | 11/2009 |
| DE | 10 2008 040 918 A1 | 2/2010 |
| DE | 10 2008 043 676 A1 | 5/2010 |
| DE | 10 2008 054 635 A1 | 6/2010 |
| DE | 10 2009 000 252 A1 | 7/2010 |
| DE | 10 2009 000 254 A1 | 7/2010 |
| DE | 10 2009 002 203 A1 | 10/2010 |
| DE | 10 2009 002 205 A1 | 10/2010 |
| DE | 10 2009 002 206 A1 | 10/2010 |
| DE | 10 2009 002 661 A1 | 10/2010 |
| DE | 10 2009 017 226 A1 | 10/2010 |
| DE | 10 2009 026 545 A1 | 12/2010 |
| DE | 10 2009 028 305 A1 | 2/2011 |
| EP | 1 705 406 A1 | 9/2006 |
| EP | 1 752 680 A2 | 2/2007 |
| EP | 1 767 829 A2 | 3/2007 |
| WO | 2006/074707 A1 | 7/2006 |
| WO | 2010/081820 A1 | 7/2010 |
| WO | 2010/115806 A1 | 10/2010 |

OTHER PUBLICATIONS

German Search Report Corresponding to 10 2010 063 029.2 mailed Jun. 24, 2011.
German Search Report Corresponding to 10 2010 063 028.4 mailed Jun. 22, 2011.
International Search Report Corresponding to PCT/EP2011/069581 mailed Dec. 30, 2011.
International Search Report Corresponding to PCT/EP2011/069580 mailed Dec. 30, 2011.
International Search Report Corresponding to PCT/EP2011/069555 mailed Feb. 2, 2012.
Written Opinion Corresponding to PCT/EP2011/069581 Dec. 30, 2011.
Written Opinion Corresponding to PCT/EP2011/069580 Dec. 30, 2011.
Written Opinion Corresponding to PCT/EP2011/069555 mailed Feb. 2, 2012.
International Preliminary Report Concerning Patentability Corresponding to PCT/EP2011/069580 mailed Mar. 19, 2013.

* cited by examiner

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

METHOD FOR THE OPERATION OF A TRANSMISSION DEVICE IN A VEHICLE DRIVE TRAIN WHEN A REQUEST IS MADE TO CHANGE GEARS

This application is a National Stage completion of PCT/EP2011/069581 filed Nov. 8, 2011, which claims priority from German patent application serial no. 10 2010 063 027.6 filed Dec. 14, 2010.

FIELD OF THE INVENTION

The invention concerns a method for operating a transmission device in a vehicle drive-train when a request is made to change gears.

BACKGROUND OF THE INVENTION

From DE 10 2005 002 337 A1 a transmission device designed as an 8-gear multi-step transmission is known, which comprises frictional shifting elements such as disk clutches and disk brakes. When a shift demand is made for a gearshift in the transmission device, at least one frictional shifting element which is engaged in order to obtain the actual gear currently engaged in the transmission device has to be disengaged out of the force flow of the transmission device, whereas at least one other frictional shifting element, which is disengaged from the force flow of the transmission device while the actual gear is currently engaged in the transmission device, has to be engaged in the force flow of the transmission device in order to obtain the required gear.

During this, with increasing shifting time the torque transmitted by the frictional shifting element engaged in the force flow in order to obtain the current actual gear of the transmission device is transferred to a greater or lesser extent to the frictional shifting element that has to be engaged in the force flow of the transmission device in order to obtain the required target gear, while the torque transmitted by the shifting element to be disengaged decreases.

Disadvantageously, frictional shifting elements in the open operating condition give rise to drag torques which impair the overall efficiency of an automatic transmission to an undesired extent.

For that reason transmission devices such as that known from DE 10 2008 000 429 A1 are to an increasing extent designed, besides frictional shifting elements, also with interlocking shifting elements in the area of which no drag torques that impair the overall efficiency of a transmission device occur.

In that case, however, it must be borne in mind that interlocking shifting elements can only be shifted when close to their synchronous point from an open operating condition, in which no torque can be transmitted by the interlocking shifting element, to their closed operating condition, in which the full torque applied can be transmitted by the interlocking shifting element. In addition, interlocking shifting elements engaged in the force flow of a transmission device can only be disengaged from the force flow by means of low shifting forces when they are close to their load-free operating condition. In contrast to frictional shifting elements, both for the synchronization of interlocking shifting elements and also to change interlocking shifting elements to their load-free condition, additional constructional devices are needed in order to enable shifts in transmission devices that involve at least one interlocking shifting element to be carried out within desirable shifting times.

With the transmission devices described above, in order to be able in each case to carry out a required gearshift from an actual gear in the direction of a target gear, to implement which an interlocking shifting element has to be changed from its closed to its open operating condition while at the same time a frictional shifting element has to be changed from its open to its closed operating condition, and to do this to a desired extent with good shifting quality and a high level of shifting comfort, the interlocking shifting element to be disengaged must be opened at the correct time, i.e. within an operating condition window during which the torque applied to the interlocking shifting element is substantially at least approximately equal to zero.

For example, if the opening of the interlocking shifting element is mistimed due to too early or too late actuation of the interlocking shifting element, there is a possibility that at a predefined nominal opening time at least some of the torque transmitted by the transmission device will still be applied at the interlocking shifting element, and due to the opening of the interlocking shifting element this will result, in a vehicle drive-train made with the transmission device, in undesired drive-train reactions caused by the abrupt fall of the torque applied at the interlocking shifting element, which are perceived by a driver of a vehicle built with the vehicle drive-train as an unpleasant and appreciable jerk.

Moreover, if a disengagement or separation attempt is made too late when the transmission capacity of the frictional shifting element to be engaged is already too high, the possibility exists that the interlocking shifting element can only be changed to its open operating condition by applying undesirably large shifting forces, this being because of high friction forces between the mutually engaged shifting element halves of the interlocking shifting element to be opened, caused by stresses in the area of the transmission device.

If the interlocking shifting element to be disengaged is not changed to its open operating condition to the desired extent and at the same time the frictional shifting element to be engaged is actuated in the direction of its closed operating condition, undesired redundancies occur in the area of a transmission device which in some circumstances have the result that owing to a too rapid or defective build-up of the transmission capacity in the area of the frictional shifting element to be engaged, from a defined time point onward an interlocking shifting element to be disengaged can no longer be changed to its open operating condition within predefined operating times.

In transmission devices made exclusively with frictional shifting elements, by virtue of a software-technical evaluation of the actuating currents of electrically operated actors of an electro-hydraulic actuating device it is ensured that redundancy of a gearset is avoided. With an appropriate design of the frictional shifting elements, for example in which the frictional shifting elements are in each case acted upon in the opening direction by a spring mechanism that applies an opening force, it can be assumed that, provided the electrically operated actors or pressure regulators are correctly controlled, in the event of an opening demand the frictional shifting elements will in fact change to their open condition also because of the spring preloading.

In the case of interlocking shifting elements, for the reasons described earlier this cannot be ensured over the full operating range of an interlocking shifting element.

SUMMARY OF THE INVENTION

Thus, the purpose of the present invention is to provide a method for operating a transmission device of a vehicle drive-train, when a gearshift is required from an actual gear toward a target gear, the gearshift involving a number of frictional shifting elements and at least one interlocking shifting element, by means of which method a redundancy of a gearset can be verified and undesired stress situations in the area of the transmission device can be reliably avoided.

In the method according to the invention for operating a transmission device of a vehicle drive-train, in the event of a demand for a gearshift from an actual gear toward a target gear involving a number of frictional shifting elements and at least one interlocking shifting element, the actors which, to obtain various gears, can be operated electrically by an electro-hydraulic actuating device which sets defined actuating currents, in the area of which hydraulic actuating pressures for actuating the shifting elements can be specified, are switched on or off in such manner that to carry out the required gearshift the at least one interlocking shifting element has to be disengaged and at least one of the frictional shifting elements has to be engaged, and wherein an engaged operating condition of the shifting elements is in each case recognized by determining a value of an operating condition dependent actuating current at which the shifting element concerned is changed to the engaged operating condition or held therein, during the implementation of the required gearshift the actuating currents of all the shifting elements are determined in order to determine the current operating conditions of the shifting elements, and in addition the current operating condition of the interlocking shifting element to be disengaged is tested for plausibility by a sensor device. If an actuating current equivalent to a closed operating condition of the frictional shifting element to be engaged and an actuating current equivalent to an open operating condition of the interlocking shifting element to be disengaged are determined, then if at the same time a closed operating condition of the interlocking shifting element to be disengaged is detected by the sensor device a malfunction case is recognized. If the malfunction is recognized over a predefined test period, then one or more selected shifting elements are disengaged and a force flow in the area of the transmission device is interrupted, or the current actual gear is engaged in the transmission device by disengaging the frictional shifting element to be engaged.

To recognize the shift condition and thus also to avoid a redundant gearset of a transmission device, the plausibility test according to the invention uses, on the one hand, the currently existing actuating current and in addition one or more signals from a sensor device, in order to ascertain that the shifting elements are correctly actuated in accordance with the desired driving position and driving gear.

If, despite corrective actuation or control by the electro-hydraulic actuating device, the shifting element to be disconnected has not changed to its open operating condition to the required extent within the predefined test period, a redundancy of the gearset of the transmission device is avoided by interrupting the force flow in the area of the transmission device. Alternatively, stresses in the area of the transmission device or redundancy of the gearset of the transmission device are avoided, contrary to the existing demand for a gearshift from the actual gear toward the target gear, by disengaging the frictional shifting element to be engaged and engaging the current actual gear in the transmission device.

In a further advantageous variant of the method according to the invention, the operating condition of the interlocking shifting element to be disengaged is tested for plausibility in each case after the lapse of a partial test period which is preferably an integer fraction of the test period. In this case, after each plausibility test carried out on the operating condition of the interlocking shifting element to be disengaged, if the malfunction case is recognized a malfunction register value is increased by a certain amount and is otherwise reduced by the amount. This variant is characterized by great robustness compared with a short-term recognition of stress situations in the area of the transmission device, since a short-term recognition of a stress situation does not immediately lead to interruption of the force flow in the area of the transmission device or to the engagement of the actual gear in the transmission device.

In a further advantageous variant of the method according to the invention, the force flow in the area of the transmission device is interrupted or the actual gear is engaged in the transmission device by disengaging the frictional shifting element to be engaged, if the malfunction value stored in the malfunction register exceeds a threshold value.

If a lower limit of the malfunction register value is equal to zero, when a malfunction case is recognized the malfunction register value is in each case increased starting from a defined basic value level and the force flow in the area of the transmission device is interrupted or the actual gear is engaged in the transmission device by disengaging the frictional shifting element to be engaged, if the malfunction case occurs over the predefined test period.

In a further variant of the method according to the invention that can be implemented with little constructional complexity, the current operating condition is determined by means of a position sensor device by which, during the opening phase of the interlocking shifting element in which an interlock between two shifting element halves of the interlocking shifting element is released by a relative movement in the axial direction between the shifting element halves, in each case a current axial position of the shifting element halves relative to one another can be determined.

In this variant the current operating condition of the interlocking shifting element to be disengaged during the implementation of the required gearshift, starting from the actual gear in the direction toward the target gear, can be determined with great precision directly in the area of the interlocking shifting element, and besides in a space-saving and inexpensive manner.

If a torque sensor device is associated with the interlocking shifting element, by means of which a torque currently transmitted by the interlocking shifting element can be determined, then in a further advantageous variant of the method according to the invention, if a torque currently transmitted via the interlocking shifting element is greater than a defined torque threshold it can be determined with little constructional complexity that the interlocking shifting element is in a closed operating condition.

If a rotational speed sensor device is associated with the interlocking shifting element, by means of which a speed difference between the shifting element halves of the interlocking shifting element can be determined, then if a currently existing rotational speed difference is smaller than a defined speed difference threshold it can be inexpensively determined that the interlocking shifting element is in a closed operating condition, since transmission devices are usually made with rotational speed sensor devices for determining the speeds of components.

In a further variant of the method according to the invention that can be carried out with little constructional complexity and can be implemented inexpensively in existing transmission systems, the closed operating condition of the interlocking shifting element is determined by means of a rotational speed sensor device by which a transmission input speed and a transmission output speed can be determined, wherein the closed operating condition of the interlocking shifting element is determined if there is a quotient between the transmission input and transmission output rotational speeds that corresponds to the value of the actual gear ratio.

In a further advantageous variant of the method according to the invention, the current operating condition of the interlocking shifting element is determined by means of a pressure sensor device by which a pressure value of the actuating pressure of the interlocking shifting element equivalent to a closed operating condition and to an open operating condition of the interlocking shifting element can be determined.

In another advantageous variant of the method according to the invention, the current operating condition of the interlocking shifting element is determined by means of a sensor device by which, respectively, an electrical current value in the area of the interlocking shifting element equivalent to a closed operating condition and one equivalent to an open operating condition thereof can be determined, such that the current in the open operating condition of the interlocking shifting element adopts a first limit value and, with increasing closure, varies in the direction of a second limit value that is equivalent to the fully closed operating condition of the interlocking shifting element.

Both the characteristics specified in the claims and those indicated in the following example embodiments of the object according to the invention are in each case, whether considered in isolation or in any combination with one another, suitable as further developments of the object of the invention. In relation to the further development of the object according to the invention, the respective combinations of characteristics have no restrictive force, but rather, are described only as examples.

BRIEF DESCRIPTION OF THE DRAWINGS

Further advantages and advantageous further developments of the invention emerge from the example embodiments whose principle is described with reference to the drawings, which show.

DETAILED DESCRIPTION OF THE PREFERRED EMBODIMENTS

Figures 1, 2:
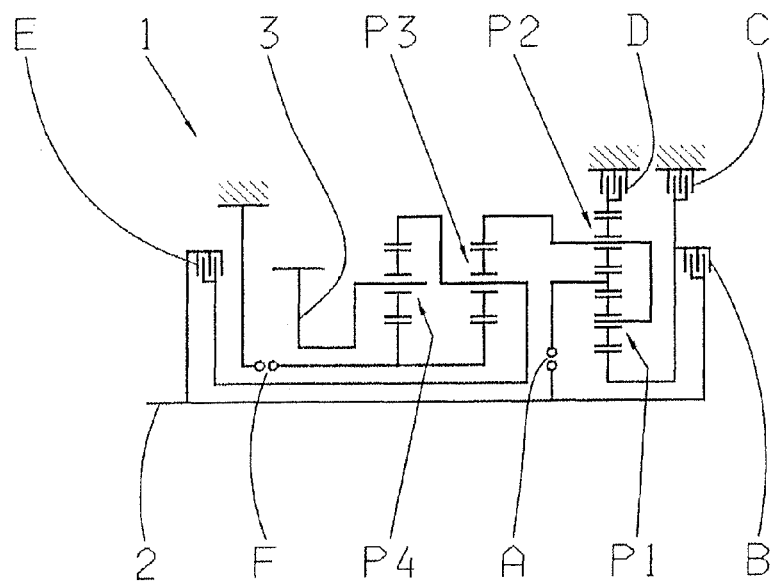
FIG. 1: A gearset layout of a transmission device.
FIG. 2: A table showing the shifting logic of the transmission device illustrated in FIG. 1.

FIG. 1 shows a gearwheel layout of a transmission device 1 or multi-step transmission, which is basically known from DE 10 2008 000 429 A1. The transmission device 1 comprises a drive input shaft 2 and a drive output shaft 3, the latter in its installed condition in the vehicle being connected to a drive output of the vehicle, whereas the drive input shaft 2 is functionally connected to a drive engine.

Furthermore, the transmission device 1 comprises four planetary gearsets P1 to P4, wherein the first and second planetary gearsets P1, P2, which are preferably designed as minus planetary gearsets, form a shiftable intermediate gear system whereas the third and fourth planetary gearsets P3 and P4 form the main gear system. The transmission device 1 also comprises six shifting elements A to F, of which the shifting elements C, D and F are in the form of brakes and the shifting elements A, B and E are shifting clutches.

With the shifting elements A to F, as shown in the shifting logic scheme represented in detail in FIG. 2 nine forward gears "1" to "9" and one reversing gear "R" can be engaged selectively, such that to produce a force flow through the transmission device 1 in each case three shifting elements at a time have to be changed to or kept in a closed operating condition.

In this case the shifting elements A and F are designed as interlocking shifting elements without any additional synchronization, in order, during the operation of the transmission device 1, to reduce drag torques caused by open frictional shifting elements by comparison with transmission devices made using frictional shifting elements alone. Since in general interlocking shifting elements can only be changed from a closed to an open operating condition within a very narrow operating condition window close to their load-free operating condition, without additional constructional measures the load-free operating condition of an interlocking shifting element that has to be disengaged is obtained by appropriate actuation of the respective shifting elements involved in the gearshift. This applies both for traction and thrust shifts, so the interlocking shifting elements can be in the form of claw clutches designed with or without additional synchronization means.

The mode of action of the method according to the invention will now be explained in detail with reference to the operating condition variations over time t of a number of operating parameters of the transmission device 1 of FIG. 1, shown in detail in FIG. 3. The method according to the invention can be used both for the monitoring and actuation of the interlocking shifting element F during a required gearshift starting from the fourth gear "4" toward the fifth gear "5", to carry out which the frictional shifting element B has to be engaged and the interlocking shifting element F disengaged, and also for the monitoring and actuation of the interlocking shifting element A during a required gearshift starting from the seventh gear "7" toward the eighth gear "8", to carry out which the frictional shifting element C has to be engaged and the interlocking shifting element A disengaged.

At a time T1 the fourth gear "4" or the seventh gear "7" for forward driving is engaged in the transmission device 1. At time T1 a demand is made for a gearshift starting from the currently engaged actual gear "4" or "7" toward the fifth gear "5" or the eighth gear "8" for forward driving, namely the respective target gear, for which, respectively, the frictional shifting element B or the shifting element C has to be closed and at the same time the interlocking shifting element F or the shifting element A has to be changed from its closed operating condition to its open operating condition.

From time T1 the transmission capacity of the frictional shifting element B or C is increased by correspondingly increasing the actuating pressure p_B or p_C. For this, from time T1 the actuating pressure p_B or p_C is raised abruptly to a rapid-filling pressure level and held at that pressure level during a rapid-filling phase that lasts until a time T5. Then, the actuating pressure p_B or p_C is changed abruptly to a filling compensation pressure level and left at that pressure level during a filling compensation phase that lasts until a later time T6, such that at time T6 the shifting element B or C to be engaged is in an operating condition in which its transmission capacity is essentially at least approximately equal to zero, but starting from which a pressure increase immediately results in an increase of the transmission capacity. Again after this, from time T6 the actuating pressure p_B or p_C of the shifting element B or C to be engaged is changed along a pressure gradient that lasts until a time T7, to an intermediate pressure level whereby the transmission capacity of the shifting element B or C to be engaged increases and torque is increasingly transmitted by the frictional shifting element B or C to be engaged.

Figure 3:
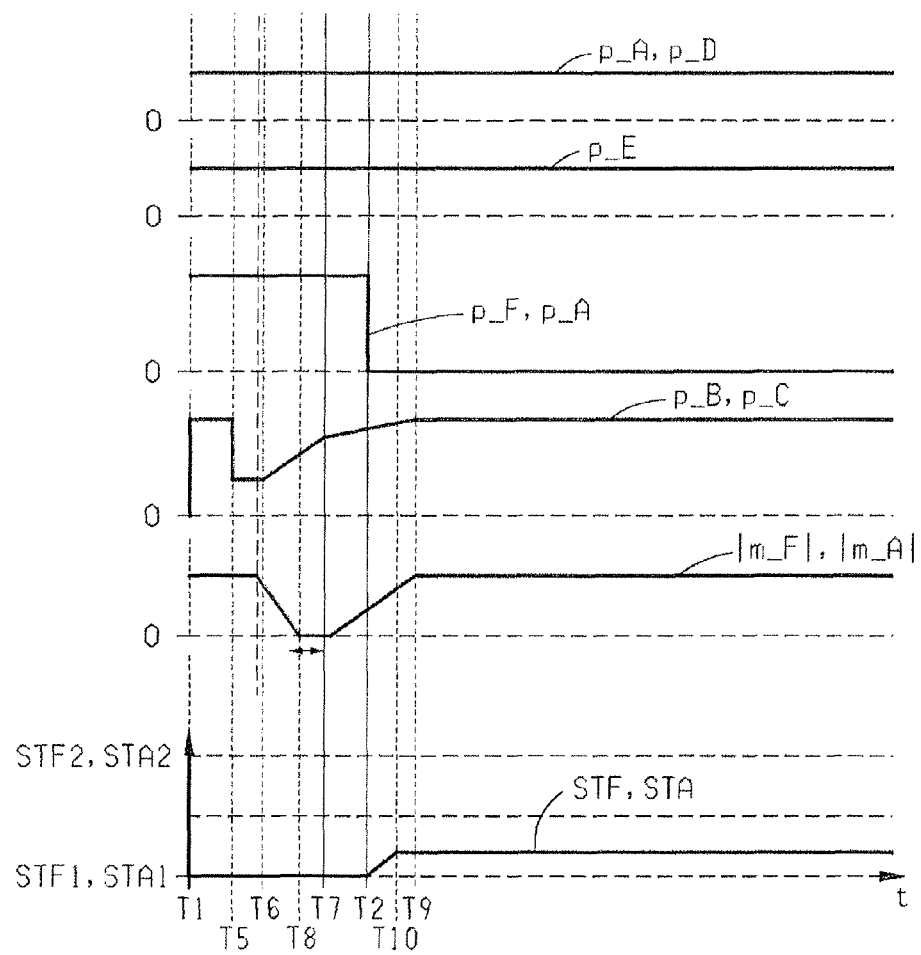
FIG. 3: A number of variations of various operating condition parameters of the transmission device in FIG. 1 when a gearshift has been called for, during which an interlocking shifting element has to be disengaged and a frictional shifting element has to be engaged.

In turn, the above-described actuation of the shifting element B or C to be engaged has the result that the torque applied at the interlocking shifting element F or A to be disengaged, whose quantitative variation |m_F| or |m_A| is shown in FIG. 3, is reduced starting shortly before the time T6 and is at least approximately equal to zero at a time T8, so that the shifting element F or A to be disengaged is then in an operating condition range required for its disengagement.

At a further time point T2 later than T8 an actuating pressure p_F of the interlocking shifting element F or an actuating pressure p_A of the interlocking shifting element A is reduced abruptly from its closing pressure level to an opening pressure level in order to change the interlocking shifting element F or the interlocking shifting element A from its closed operating condition to its open operating condition in accordance with the existing demand for the gearshift or upshift from the fourth gear "4" or the seventh gear "7" toward the fifth gear "5" or the eighth "8", respectively. The abrupt reduction of the actuating pressure p_F or p_A of the interlocking shifting element F or the interlocking shifting element A constitutes the beginning of an opening phase of the interlocking shifting element F or the interlocking shifting element A, during which an interlock between the two shifting element halves must be released by a relative movement between the shifting element halves in the axial direction.

The shifting elements A and E also currently engaged in the transmission device 1 to obtain the actual gear "4" are acted upon throughout the operating condition variation shown in FIG. 3 by actuating pressures p_A and p_E, which are the closing pressures of the shifting elements A and E. Correspondingly, the shifting elements D and E which must be kept in the engaged operating condition to obtain the seventh gear "7" are also acted upon throughout the operating condition variation by actuating pressures p_D and p_E at the closing pressure level of the shifting elements D and E.

The current relative positions between the two shifting element halves of the interlocking shifting element F or the interlocking shifting element A, respectively, are monitored by a respective position sensor device associated with the interlocking shifting element F or the interlocking shifting element A, by means of which, in each case, a current axial position of the shifting element halves relative to one another can be determined.

Reducing the actuating pressure p_F or p_A brings about a displacement of one of the shifting element halves of the interlocking shifting element F or A away from the other shifting element half, which is designed not to be displaced. The current position of the displaceable shifting element half of the interlocking shifting element F or A is depicted by the variation STF or STA shown graphically in FIG. 3, wherein before time T2 the displaceable shifting element half of the interlocking shifting element F or A is in its first end position STF1 or STA1, which is equivalent to the fully closed operating condition of the interlocking shifting element F or A. From time T2 the displaceable shifting element half of the interlocking shifting element F or A is pushed, due to the reduced actuating pressure p_F or p_A, in the direction toward its second end-stop STF2 or STA2, which is a position of the displaceable shifting element half equivalent to the fully open operating condition of the interlocking shifting element F or A.

The above-described actuation of the shifting elements A, B, E and F or the shifting elements A, C, D and E when there is a demand for a gearshift from the respective current gear "4" or "7" toward the target gear "5" or "8" takes place by means of an electro-hydraulic actuating device, such that the actuating device produces defined actuating currents for electrically operated actors in whose area hydraulic actuating pressures for actuating the shifting elements A to F can be specified. During this, in general an engaged operating condition of the shifting elements A to F is in each case recognized by the determination of a value of an operating condition dependent actuating current at which the shifting element A to F concerned is changed to or kept in the engaged operating condition. The actuating currents are varied as a function of a respective torque applied at the drive input shaft 2 and as a function of a current operating temperature of the transmission device 1, in order to be able to engage or disengage the shifting elements A to F within predefined operating times and to be able to provide the frictional shifting elements B, C, D and E in each case with the transmission capacity required for transmitting the torque currently applied at the input shaft 2.

In order, while the required gearshift is being carried out, to be able to detect any stress situations in the area of the transmission device 1, while the required gearshift is being carried out from the current gear "4" or "7" toward the target gear "5" or "8", respectively, the actuating currents of all the shifting elements A to F are determined in order to detect the current operating conditions of the shifting elements A to F. In addition, the current operating condition of the interlocking shifting element F or A to be disengaged is plausibility tested by means of the position sensor device associated with the interlocking shifting element F or A, in the manner described below as an example.

For the actuation, shown in FIG. 3, of the frictional shifting element B or C to be engaged, already from time T7 the actuating pressure p_B or p_C is increased from the intermediate pressure level, at which the frictional shifting element B or C to be engaged is already preferably in its slip-free operating condition, until at a time T9 it is at the closing pressure level at which the frictional shifting element B or C has its full transmission capacity, when the frictional shifting element B or C is fully engaged so that in principle all of the torque to be transferred by way of the transmission device 1 can be transmitted in the area of the frictional shifting element B or C.

The result is that at the interlocking shifting element F or A to be disengaged, despite the correct actuation of the shifting element F or A to be disengaged there is a torque that impedes the disengagement process and in the transmission device 1 there exist stress conditions, since the interlock in the area of the interlocking shifting element F or A to be disengaged has not yet been separated. These stress conditions impede the opening of the interlocking shifting element F or A to be disengaged, in such manner that as shown in detail in FIG. 3, from time T2 the displaceable half of the interlocking shifting element F or A is first pushed in the direction toward its second end position STF2 or STA2. With increasing transmission capacity, however, the friction torque acting, in the area of the interlocking shifting element F or A to be disengaged, between the still mutually engaged shifting element halves increases to such an extent that at a time T10 the opening movement between the shifting element halves of the interlocking shifting element F or A stops, the interlocking shifting element F or A does not change to its open operating condition and owing to the increasingly engaged condition of the frictional shifting element B or C to be engaged, there is a gearset redundancy in the area of the transmission device 1.

To avoid gearset redundancy of the transmission device 1, when an actuating current equivalent to the closed operating condition of the frictional shifting element B or C to be closed and an actuating current equivalent to an open operating condition of the interlocking shifting element F or A to be disengaged are determined while, at the same time, a closed operating condition of the interlocking shifting element F or A is detected by means of the position sensor device, a fault is recognized and if this fault is recognized over a predefined test period, all the shifting elements A to F are disengaged by corresponding adjustment of their actuating currents and the force flow in the area of the transmission device 1 is interrupted.

The plausibility testing of the operating condition of the interlocking shifting element F or A to be disengaged is in each case carried out after the passage of a partial test period, preferably amounting to 10 to 50 milliseconds, and which is an integral fraction of the full test period preferably amounting to 200 to 300 milliseconds. Each time the plausibility test of the operating condition of the interlocking shifting element F or A to be disengaged is carried out, if a fault is recognized a fault register value is increased by a defined amount and otherwise it is reduced by the amount. The force flow in the area of the transmission device 1 is interrupted if the fault register value stored in the fault register exceeds a threshold value.

It is also possible, instead of determining the current operating condition of the interlocking shifting element F or A by means of a position sensor device, or in addition to using the signal from the position sensor device, to determine the current operating condition by means of a rotational speed sensor device by which a transmission input rotational speed and a transmission output speed can be determined. In this case the closed operating condition of the interlocking shifting element F or A to be disengaged is recognized if a quotient between the transmission input and transmission output rotational speeds corresponds to the value of the current gear ratio "4" or "7".

Again as a function of the application concerned, in a further variant of the method according to the invention it is provided that the current operating condition of the interlocking shifting element F or A is determined by a torque sensor device associated with the interlocking shifting element by means of which the torque currently transmitted by the interlocking shifting element F or A can be determined. A closed operating condition of the interlocking shifting element F or A is then recognized if the torque currently transmitted by the interlocking shifting element is larger than a defined torque threshold, which is preferably greater than zero.

If a rotational speed sensor device is associated with the interlocking shifting element F or A, by means of which a speed difference between the shifting element halves of the interlocking shifting element can be determined, the closed operating condition of the interlocking shifting element is recognized if the current rotational speed difference is zero.

Basically, the above-described variants of the method according to the invention can also be used to detect a closed operating condition of an interlocking shifting element both halves of which are displaceable.

INDEXES

1 Transmission device
2 Drive input shaft
3 Drive output shaft
"1" to "9" Gear for forward driving
A to F Shifting element
|m_A|, |m_F| Variation of the torque applied at the interlocking shifting element to be disengaged
p_A, p_B,
p_C, p_D, p_F Actuating pressure
P1 to P4 Planetary gearset
"R" Reversing gear
STA, STF Variation of the position of the shifting element half of the interlocking shifting element designed to be displaced
STA1, STF1 First end position
STA2, STF2 Second end position
t Time
T1, T2 Discrete time point
T5 to T10 Discrete time point

The invention claimed is:

1. A method of operating a transmission device (1) of a vehicle drive-train when there is a request for a gearshift from a currently engaged gear ("4" or "7") to a target gear ("5" or "8"), the transmission device having a plurality of frictional shifting elements (B, C, D, E) and at least one interlocking shifting element (A, F), comprising first and second mating shifting element halves, which are selectively engaged or disengaged by an electro-hydraulic actuating device to obtain various gears ("1" to "R"), the actuating device sets actuating electrical currents for electrically operated actors to specify hydraulic actuating pressures (p_A, p_B, p_C, p_D, p_E, p_F) for actuating the frictional and the interlocking shifting elements (A to F), for carrying out the requested gearshift, the at least one interlocking shifting element (F or A) has to be disengaged and at least one of the frictional shifting elements (B or C) has to be engaged, and an engaged operating condition of the frictional and the interlocking shifting elements (A to F) is recognized by determining a value of an operating condition dependent actuating current, at which the shifting element (A to F) concerned is either changed to or maintained in the engaged operating condition, the method comprising the steps of:

determining the actuating currents of all the frictional and the interlocking shifting elements (A to F) while the required gearshift is being carried out to determine current operating conditions of each of the frictional and the interlocking shifting elements (A to F);

testing, with a sensor device, a plausability of the current operating condition of the interlocking shifting element (F or A) to be disengaged;

recognizing a fault when both:
an actuating current equivalent to an engaged operating condition of the frictional shifting element (B or C) to be engaged is determined, and
an actuating current equivalent to a disengaged operating condition of the interlocking shifting element (F or A) to be disengaged is determined, and, at the same time, the sensor device determines that the interlocking shifting element (F or A) to be disengaged is engaged; and when the fault is recognized over a predefined test period, either:
disengaging one or more selected shifting elements and interrupting a force flow in the transmission device (1), or
disengaging the frictional shifting element (B or C) to be engaged so as to maintain continued engagement of the currently engaged gear ("4" or "7") of the transmission device (1).

2. A method of operating a transmission device (1) of a vehicle drive-train when there is a request for a gearshift from a currently engaged gear ("4" or "7") to a target gear ("5" or "8"), the transmission device having a plurality of frictional shifting elements (B, C, D, E) and at least one interlocking shifting element (A, F), comprising first and second mating shifting element halves, which are selectively engaged or disengaged by an electro-hydraulic actuating device to obtain various gears ("1" to "R"), the actuating device controls actuating electrical currents for electrically operated actors in order to specify hydraulic actuating pressures (p_A, p_B, p_C, p_D, p_E, p_F) for actuating the frictional and the interlocking shifting elements (A to F), and carrying out the requested gearshift, the at least one interlocking shifting element (F or A) has to be disengaged and at least one of the frictional shifting elements (B or C) has to be engaged, and an engaged operating condition of the frictional and the interlocking shifting elements (A to F) is recognized by determining a value of an operating condition dependent actuating current, at which the shifting element (A to F) concerned is either changed to or maintained in the engaged operating condition, the method comprising the steps of:

determining the actuating currents of all the frictional and the interlocking shifting elements (A to F) while the required gearshift is being carried out to determine current operating conditions of the frictional and the interlocking shifting elements (A to F);

testing, with a sensor device, a plausability of the current operating condition of the interlocking shifting element (F or A) to be disengaged;

recognizing a fault, if an actuating current equivalent to an engaged operating condition of the frictional shifting element (B or C) to be engaged is determined, and an actuating current equivalent to a disengaged operating condition of the interlocking shifting element (F or A) to be disengaged is determined and, at the same time, the sensor device determines that the interlocking shifting element (F or A) to be disengaged is engaged; and when the fault is recognized over a predefined test period, at least one of:

disengaging one or more selected shifting elements and interrupting a force flow in the transmission device (1), or disengaging the frictional shifting element (B or C) to be engaged to maintain the currently engaged gear ("4" or "7");

testing the plausibility of the operating condition of the interlocking shifting element (F or A) to be disengaged after the passage of a partial test period, and the partial test period being an integral fraction of a full test period, and after each such test of the plausibility of the operating condition of the interlocking shifting element (F or A) to be disengaged, if a fault is recognized, increasing a fault register value by a certain amount and, otherwise, reduced by the certain amount.

3. The method according to claim 2, further comprising the step of either interrupting the force flow in an area of the transmission device (1) or engaging the currently engaged, gear ("4" or "7") in the transmission device (1) by disengaging the frictional shifting element (B or C) to be engaged, if the fault register value, in a fault register, exceeds a threshold value.

4. The method according to claim 3, further comprising the step of setting zero as a lower limit of the fault register value.

5. The method according to claim 1, further comprising the step of determining the current operating condition of the interlocking shifting element (F or A) to be disengaged with a position sensor device by which, during an opening phase of the interlocking shifting element (F or A), during which an interlock between two shifting element halves of the interlocking shifting element (F or A) should be separated by a relative movement between the shifting element halves in the axial direction, in each case an actual axial position of the shifting element halves relative to one another can be determined.

6. The method according to claim 1, further comprising the step of determining torque, with a torque sensor device, that is currently being transmitted by the interlocking shifting element with the interlocking shifting element and, if the torque currently transmitted by the interlocking shifting element exceeds a defined torque threshold, the engaged operating condition of the interlocking shifting element is recognized.

7. The method according to claim 1, further comprising the step of determining, with a rotational speed sensor device, a rotational speed difference between shifting element halves of the interlocking shifting element and, if a current rotational speed difference is smaller than a defined rotational speed difference threshold, recognizing the engaged operating condition of the interlocking shifting element.

8. The method according to claim 1, further comprising the step of determining, with a rotational speed sensor, the current operating condition of the interlocking shifting element to be disengaged, the rotational speed sensor determining a transmission input speed and a transmission output speed, and recognizing the engaged operating condition of the interlocking shifting element if a quotient between the transmission input speed and the transmission output speed corresponds to a value of a currently engaged gear ratio.

9. The method according to claim 1, further comprising the step of determining, with a pressure sensor device, the current operating condition of the interlocking shifting element, and the pressure sensor device respectively determining a pressure value of the actuating pressure of the interlocking shifting element corresponding to a engaged operating condition and to an open operating condition of the interlocking shifting element.

10. A method of operating a transmission device (1) of a vehicle drive-train when there is a request for a gearshift from a currently engaged gear ("4" or "7") to a target gear ("5" or "8"), the transmission device having a plurality of frictional shifting elements (B, C, D, E) and at least one interlocking shifting element (A, F), comprising first and second mating shifting element halves, which are selectively engaged or disengaged by an electro-hydraulic actuating device to obtain various gears ("1" to "R"), the actuating device controls actuating electrical currents for electrically operated actors in order to specify hydraulic actuating pressures (p_A, p_B, p_C, p_D, p_E, p_F) for actuating the frictional and the interlocking shifting elements (A to F), and carrying out the requested gearshift, the at least one interlocking shifting element (F or A) has to be disengaged and at least one of the frictional shifting elements (B or C) has to be engaged, and an engaged operating condition of the frictional and the interlocking shifting elements (A to F) is recognized by determining a value of an operating condition dependent actuating current, at which the shifting element (A to F) concerned is either changed to or maintained in the engaged operating condition, the method comprising the steps of:

determining the actuating currents of all the frictional and the interlocking shifting elements (A to F) while the required gearshift is being carried out to determine current operating conditions of the frictional and the interlocking shifting elements (A to F);

testing, with a sensor device, a plausability of the current operating condition of the interlocking shifting element (F or A) to be disengaged;

recognizing a fault, if an actuating current equivalent to an engaged operating condition of the frictional shifting element (B or C) to be engaged is determined, and an actuating current equivalent to a disengaged operating condition of the interlocking shifting element (F or A) to be disengaged is determined and, at the same time, the sensor device determines that the interlocking shifting element (F or A) to be disengaged is engaged; and when the fault is recognized over a predefined test period, at least one of:
- disengaging one or more selected shifting elements and interrupting a force flow in the transmission device (1), or
- disengaging the frictional shifting element (B or C) to be engaged to maintain the currently engaged gear ("4" or "7");

determining, with a sensor device, the current operating condition of the interlocking shifting element, the sensor device respectively determining a value of the current corresponding to an engaged operating condition and to a disengaged operating condition of the interlocking shifting element in an area of the interlocking shifting element, such that the value of the current in the disengaged operating condition of the interlocking shifting element adopts a first limit value and varies toward a second limit value with increasing interlock, and the second limit value being equivalent to the fully engaged operating condition of the interlocking shifting element.

11. The method according to claim 1, further comprising the step of, when the fault is recognized over a predefined test period, disengaging all of the shifting elements by corresponding adjustment of the respective actuating currents, and interrupting a force flow through the transmission device (1).

* * * * *